United States Patent [19]

Weyer

[11] Patent Number: 4,945,778

[45] Date of Patent: Aug. 7, 1990

[54] FLUID-POWER DEVICE WITH ROLLERS

[76] Inventor: Paul P. Weyer, 48811 284th S.E., Enumclaw, Wash. 98022

[21] Appl. No.: 204,521

[22] Filed: Jun. 8, 1988

Related U.S. Application Data

[63] Continuation-in-part of Ser. No. 6,007, Jan. 20, 1987, Pat. No. 4,838,103, Ser. No. 931,223, Nov. 14, 1986, Pat. No. 4,846,007, Ser. No. 881,904, Jul. 3, 1986, Pat. No. 4,741,250, Ser. No. 662,256, Oct. 17, 1984, Pat. No. 4,667,528, Ser. No. 692,293, Jan. 17, 1985, Pat. No. 4,683,767, and Ser. No. 803,954, Dec. 2, 1985, Pat. No. 4,691,582, which is a continuation-in-part of Ser. No. 575,228, Jan. 30, 1984, Pat. No. 4,590,816.

[51] Int. Cl.$^5$ .............................. F01B 3/04
[52] U.S. Cl. ............................ 74/89.15; 74/424.8 R; 92/31
[58] Field of Search .................. 74/424.8 R, 89.15; 92/2, 31, 33

[56] References Cited

U.S. PATENT DOCUMENTS

| | | | |
|---|---|---|---|
| 717,987 | 1/1903 | Gurney | 384/504 |
| 2,067,357 | 1/1937 | Terry | 74/424.8 |
| 2,131,151 | 9/1938 | Smith | 74/424.8 C |
| 2,482,082 | 9/1949 | Wahlberg | 74/424.8 C |
| 2,488,256 | 11/1949 | Anderson | 74/424.8 C |
| 2,525,326 | 10/1950 | Wahlmark | 74/424.8 C |
| 2,571,789 | 6/1956 | Orenick | 74/424.8 C |
| 2,791,128 | 5/1957 | Geyer et al. | 74/441 |
| 2,945,387 | 7/1960 | Geyer | 74/89 |
| 2,959,064 | 11/1960 | Geyer et al. | 74/441 |
| 3,020,775 | 2/1962 | Musser | 74/440 |
| 3,128,634 | 4/1964 | Eastman | 74/424.8 |
| 3,165,007 | 1/1965 | Neubarth | 74/424.8 C |
| 3,187,592 | 6/1965 | Geyer | 74/89 |
| 3,198,539 | 8/1965 | McMullen et al. | 92/31 |
| 3,255,806 | 6/1966 | Meyer et al. | 160/188 |

(List continued on next page.)

FOREIGN PATENT DOCUMENTS

| | | |
|---|---|---|
| 2260300 | 6/1974 | Fed. Rep. of Germany . |
| 2803459 | 8/1979 | Fed. Rep. of Germany . |
| 2807952 | 8/1979 | Fed. Rep. of Germany . |
| 3144306 | 7/1981 | Fed. Rep. of Germany . |
| 1496924 | 10/1967 | France . |
| 1450855 | 5/1969 | France . |
| 2338425 | 1/1977 | France . |
| 399084 | 10/1942 | Italy .................. 74/424.8 C |
| 8101440 | 5/1981 | PCT Int'l Appl. ............... 92/33 |
| 386809 | 4/1965 | Switzerland . |
| 406747 | 1/1966 | Switzerland . |
| 890440 | 2/1962 | United Kingdom . |
| 1362401 | 8/1974 | United Kingdom . |

OTHER PUBLICATIONS

Spiracon Brochure—Planetary Roller Screws. A Unique Innovation in Mechanical Linear Actuators. A four-page brochure (undated).
Moscow Bauman Tech. Coll. Week 84/ 20 Issued Jun. 27, 1984. A one-page description.
Mechanisms, Linkages, and Mechanical Controls. By Chironis, A four-page brochure, 1965, pp. 188-189.

Primary Examiner—Dwight Diehl
Assistant Examiner—Scott Anchell
Attorney, Agent, or Firm—Seed and Berry

[57] ABSTRACT

A fluid-powered actuator having a body with an interior helical groove, a drive member supported for rotary movement relative to the body, and a carrier reciprocally mounted within the body. In a first embodiment, the carrier rotatably retains first and second rollers in a fixed axial and circumferential position relative to the carrier, with the one roller engaging the body groove and the other roller engaging a helical groove formed on the drive member. The carrier includes a piston portion. In an alternative embodiment, only a single roller is used for engaging the body groove and the carrier has a key member which projects into a keyway recess of the drive member to permit substantially uninhibited axial movement of the carrier relative to the drive member as the carrier reciprocates within the body while coupling the rotational drive of the carrier to the drive member.

36 Claims, 2 Drawing Sheets

U.S. PATENT DOCUMENTS

| | | | |
|---|---|---|---|
| 3,295,385 | 1/1967 | Jenny | 74/424.8 C |
| 3,333,483 | 9/1967 | Maci et al. | 74/424.8 |
| 3,406,584 | 10/1968 | Roantree | 74/424.8 |
| 3,508,452 | 4/1970 | Roantree | 74/424.8 |
| 3,513,754 | 5/1970 | John | 92/33 |
| 3,554,457 | 1/1971 | Hutzenlaub | 384/504 |
| 3,577,796 | 5/1971 | Eissfeldt | 74/459 |
| 3,585,869 | 6/1971 | Lemor | 74/89.15 |
| 3,595,094 | 7/1971 | Lemor | 74/89.14 |
| 3,638,507 | 2/1972 | Orner | 74/424.8 |
| 3,670,583 | 6/1972 | Leming | 74/89.15 |
| 3,847,033 | 11/1974 | Toth | 74/459 |
| 3,861,226 | 1/1975 | Stanley | 74/89.15 |
| 3,965,761 | 6/1976 | Stanley | 74/89.15 |
| 4,022,076 | 5/1977 | Metz | 74/441 |
| 4,033,194 | 7/1977 | Stanley | 74/89.15 |
| 4,036,074 | 7/1977 | Bodnar | 74/409 |
| 4,050,319 | 9/1977 | Stanley | 74/89.15 |
| 4,276,003 | 6/1981 | Perkins et al. | 417/415 |
| 4,313,367 | 2/1982 | Weyer | 92/33 |
| 4,369,011 | 1/1983 | Ploss | 411/223 |
| 4,409,888 | 10/1983 | Weyer | 92/31 |
| 4,425,009 | 1/1984 | Fillon et al. | 384/504 |
| 4,493,614 | 1/1985 | Chu et al. | 417/22 |
| 4,499,813 | 2/1985 | Lampert | 92/31 |
| 4,576,057 | 3/1986 | Saari | 74/424.8 |
| 4,590,816 | 5/1987 | Weyer | 92/33 |
| 4,603,616 | 8/1986 | Zajac | 92/33 |

FLUID-POWER DEVICE WITH ROLLERS

CROSS-REFERENCE TO RELATED APPLICATIONS

This is a continuation-in-part application of applications Ser. No. 006,007, filed Jan. 20, 1987, now issued as U.S. Pat. No. 4,838,103; Ser. No. 931,223, filed Nov. 14, 1986, now issued as U.S. Pat. No. 4,846,007; Ser. No. 881,904, filed July 3, 1986, now issued as U.S. Pat. No. 4,741,250; Ser. No. 662,256, filed Oct. 17, 1984, now issued as U.S. Pat. No. 4,667,528; Ser. No. 692,293, filed Jan. 17, 1985, now issued as U.S. Pat. No. 4,683,767; and Ser. No. 803,954, filed Dec. 2, 1985, now issued as U.S. Pat. No. 4,691,582; which are continuation-in-part applications of application Ser. No. 575,228, filed Jan. 30, 1984, now issued as U.S. Pat. No. 4,590,816.

TECHNICAL FIELD

The present invention relates generally to actuators and other fluid-power devices, such as pumps, and more particularly, to fluid-power devices of the type in which axial movement of a piston results in or is produced by relative rotational or linear movement between a body and an output member.

BACKGROUND OF THE INVENTION

Rotary helical splined actuators have been employed in the past to achieve the advantage of high-torque output from a simple linear piston-and-cylinder drive arrangement. The actuator typically uses a cylindrical body with an elongated rotary output shaft extending coaxially within the body, with an end portion of the shaft providing the drive output. An elongated piston sleeve is disposed between the body and the shaft and coaxially receives the shaft therein. The piston sleeve has a sleeve portion splined to cooperate with corresponding splines on the body interior and the output shaft exterior. The piston sleeve is reciprocally mounted within the body and has a head for the application of fluid pressure to one or the other opposing sides thereof to produce axial movement of the piston sleeve.

As the piston sleeve linearly reciprocates in an axial direction within the body, the outer splines of the sleeve portion engage the splines of the body to cause rotation of the sleeve portion. The resulting linear and rotational movement of the sleeve portion is transmitted through the inner splines of the sleeve portion to the splines of the shaft to cause the shaft to rotate. Bearings are typically supplied to rotatably support one or both ends of the shaft relative to the body.

While such an arrangement produces a relatively high torque output, the capability of the actuator is inherently limited by the use of splines, the splines having certain characteristic limitations relating to the number of turns, pitch, surface contact drag and free play between the corresponding splines which limit the axial and radial loads that the shaft can be subjected to and the operating efficiency of the actuator. For high-torque, high-efficiency applications, the rigid-splined helical actuators have been found to have an undesirably high frictional coefficient and large loads can cause binding between the corresponding spline. While actuators using balls to transmit torque have been manufactured and are an improvement upon the splined actuator, further improvement is desirable.

It will therefore be appreciated that there has been a significant need for a fluid-powered actuator and other devices, such as pumps, which are capable of handling increased axial and radial shaft loads while decreasing the weight and size of the device and decreasing the difficulty and expense of manufacturing the device. The device should have a low-friction design to increase efficiency, an uncomplicated and strong design to increase reliability, and be usable for heavy-duty applications relative to the size of the device. Preferably, the device will provide a higher output efficiency by using force transmission components producing rolling friction which is less than the sliding friction of splines. The device should also be manufacturable in a sufficiently smaller size so that it can be implanted within the human body and provide a wide rotational range. For such medical uses, an outer diameter size of 1.0 inch or smaller is desired. The device should also be usable for industrial applications and manufacturable in a wide range of sizes. The present invention fulfills these needs and further provides other related advantages.

DISCLOSURE OF THE INVENTION

The present invention resides in a fluid-power device having a body and an axially extending drive member supported for movement relative to the body and connectable to an external device. Either the body or the drive member has at least one helical groove formed on the surface portion thereof positioned within the body. The device further includes at least one roller having at least one circumferential ridge, and an axially reciprocating carrier reciprocably mounted within the body. The reciprocating carrier rotatably retains the roller in a fixed axial and circumferential position relative to the reciprocating carrier during fluid-powered operation of the device, with the roller in sealed rolling engagement with the grooved surface portion for transmitting torque between the reciprocating carrier and the one of the body or drive member having the grooved surface portion.

The device further includes means for transmitting torque between the reciprocating carrier and the other of the body or the drive member, and at least one piston mounted for reciprocal movement and operatively engaging the reciprocating carrier.

In the preferred embodiments of the invention, the helical groove of the grooved surface portion has an axial pitch and a lead angle with a left-hand or right-hand turn. The roller is retained by the reciprocating member in an axially skewed position relative to the body or drive member with which it is engaged by a skew angle with an angular orientation corresponding to the hand turn to improve alignment of the roller ridge with the engaged helical groove of the grooved surface portion.

The reciprocating carrier includes a recess with a radially outward opening, with the roller positioned in the recess and projecting outward through the opening beyond the reciprocating carrier to rollingly engage the grooved surface portion. The recess has a pair of opposed and spaced-apart wall portions, with each of the wall portions supporting one or the other of a pair of first and second support arms which rotatably retain the roller against axial and circumferential movement relative to the reciprocating carrier. In the preferred embodiment, the first and second support arms for the roller are coaxial, and a coaxial pair of bore holes sized to receive the first and second support arms are provided. One bore hole is in one of the wall portions, and the other bore hole is in the other of the wall portions.

In a first embodiment of the invention, the device includes first and second rollers, with the one roller retained by a first end portion of the reciprocating carrier within a sleeve portion of the drive member having the helical drive member groove formed thereon. The second roller is retained by a second end portion of this reciprocating carrier within an end portion of the body having the body helical groove formed thereon.

In a second embodiment of the invention, only a single roller is utilized and it engages the helical body groove. The reciprocating carrier is provided with a coupling member which is coupled to a coupling portion of the drive member to permit substantially uninhibited axial movement of the coupling member relative to the coupling portion as the reciprocating carrier axially reciprocates within the body while transmitting rotational force therebetween during powered operation.

Other features and advantages of the invention will become apparent from the following detailed description, taken in conjunction with the accompanying drawings.

BEST MODE FOR CARRYING OUT THE INVENTION

Figure 1:
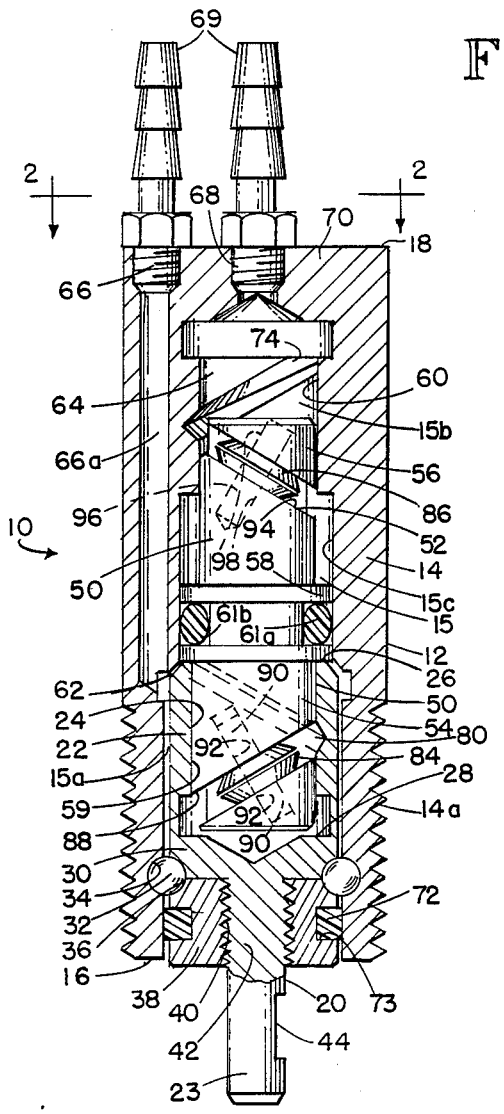
FIG. 1 is a side elevational, sectional view of a fluid-powered roller rotary actuator embodying the present invention.

As shown in the drawings for purposes of illustration, the present invention is embodied in a fluid-power device. A first embodiment of the device is a rotary actuator 10, shown in FIGS. 1 and 2. The actuator 10 includes an elongated housing or body 12 having a cylindrical sidewall 14 and first and second ends 16 and 18, respectively. The cylindrical sidewall 14 defines a three-part interior chamber 15 of the body 12 having a smooth-walled first end chamber 15a toward the first body end 16, a threaded second end chamber 15b toward the second body end 18, and a smooth-walled mid-chamber 15c positioned between the first and second end chambers.

An elongated rotary output member 20 has a cylindrical sleeve wall 22 coaxially positioned within the body 12 and extending into the first end chamber 15a. The sleeve wall 22 defines a central interior chamber 24 with an open end 26 toward the first body end 16 and an opposite closed end 28 closed by a transverse end wall 30. The output member 20 further has an output drive shaft 23 rigidly attached to the end wall 30 and extending coaxially out of the body 12 at the body first end 16.

The output member 20 is rotatably held in place against axial thrust and supported for rotation relative to the body 12 by a plurality of thrust ball bearings 32 disposed between a circumferential ball race 34 formed on the interior of the body sidewall 14 toward the first body end 16 and a circumferential ball race 36 formed in part by a half ball race formed on the exterior of the end wall 30 of the output member 20 and in part by a half ball race formed on an annular collar 38 positioned at the first body end 16. The output member 20 is further laterally supported and aligned within the body 12 by the sleeve wall 22 having a smooth circumferential outer sidewall surface sized to fit snugly within and slidably engage a correspondingly sized inner sidewall surface of the first end chamber 15a as the output member rotates within the body during fluid-powered operation of the actuator 10. The collar 38 has a threaded central aperture 40 to threadably receive therein a threaded portion 42 of the drive shaft 23 located adjacent to the end wall 30.

The drive shaft 23 has a set-screw flat 44 cut therein for coupling to an external device (not shown); however, any conventional means of attachment may be used. The body 12 is adapted for attachment to a stationary support (not shown) by an exteriorly threaded portion 14a of the sidewall 14 toward the first body end 16. It is to be understood that the invention may be practiced with the output member 20 rotatably driving an external device, or with the output member being held stationary and the rotational drive being provided by rotation of the body 12.

A solid-core cylindrical roller carrier 50 is coaxially and reciprocally mounted within the body 12. The roller carrier 50 has a carrier first end portion 54 toward the first body end 16 and a carrier second end portion 56 toward the second body end 18. The carrier first end portion 54 is coaxially positioned with and extends into the central chamber 24 of the sleeve wall 22 of the output member 20. The carrier second end portion 56 is coaxially positioned with and extends into the second end chamber 15b of the body 12. The roller carrier 50 further has a head portion 58 positioned between the carrier first and second end portions 54 and 56 and within the mid-chamber 15c of the body 12. The head portion 58 and the carrier first and second end portions 54 and 56 are formed as an integral unit and move together during fluid-powered operation of the actuator 10.

The carrier first and second end portions 54 and 56 each have a smooth circumferential outer sidewall surface sized to fit snugly within and slidably engage a correspondingly sized inner sidewall surface 59 of the sleeve wall 22 of the output member 20 and a correspondingly sized inner sidewall surface 60 of the body sidewall 14 in the second end chamber 15b, respectively, as the roller carrier 50 axially reciprocates within the body 12 during fluid-powered operation of the actuator 10. This snug fit and sliding engagement provide lateral support and guiding alignment of the roller carrier 50 within the body 12 without the need for bearings beyond the bearing action provided by the force-transmitting disk rollers, which will be described below.

The head portion 58 of the roller carrier 50 carries a conventional fluid seal 61a, disposed in a circumferential seal-retaining groove 61b. The seal 61 is positioned between the head portion 58 and the smooth-walled mid-chamber 15c of the body 12 to define fluid-tight compartments 62 and 64 to each side of the head portion toward the first body end 16 and the second body end 18, respectively. The smooth-walled mid-chamber 15c of the body 12 has sufficient axial length to accommodate the full stroke of the head portion 58 within the body 12.

Reciprocation of the roller carrier 50 within the body 12 occurs when hydraulic fluid or air under pressure selectively enters through one or the other of a port 66 located in the sidewall 14 and a port 68 located in an end wall 70 of the body 12 closing the second end chamber 15b at the second body end 18. As used herein, "fluid" will refer to hydraulic oil, air or any other fluid suitable for use in the actuator 10. The ports 66 and 68 each communicates with one of the fluid-tight compartments 62 and 64, respectively. The parts 66 and 68 each have a hose connector 69 attached thereto for connection of fluid pressure hoses (not shown). The port 66 communicates with the compartment 62 through an axially extending channel 66a formed in the body sidewall 14. A conventional seal 72 is disposed in a circumferential seal groove 73 in the collar 38 to position the seal between the collar the body sidewall 14 al an the first body end 16 to prevent fluid leakage from the interior chamber of the body 12 out the first body end.

The application of fluid pressure to the compartment 62 produces axial movement of the roller carrier 50 toward the second body end 18. The application of fluid pressure to the compartment 64 produces axial movement of the roller carrier 50 toward the first body end 16. The actuator 10 provides relative rotational movement between the body 12 and the output member 20 through the conversion of linear movement of the roller carrier 50 into rotational movement of the output member, as will be described in more detail below.

The inner sidewall surface 60 of the body sidewall 14 in the second end chamber 15b toward the second body end 18 has cut therein a single helical groove 74 with a desired lead angle and lead. The helical body groove 74 in the embodiment of FIG. 1, which is designed to produce 360 degrees of rotation of the output member 20, extends around the sidewall 14 about 180 degrees plus some amount for runout.

The inner sidewall surface portion 59 of the sleeve wall 22 of the output member 20 has cut therein a single helical groove 80 with a desired lead angle and lead. The helical shaft groove 80 extends around the sleeve wall 22 about 180 degrees plus some amount for runout.

The helical body groove 74 may have the same or an opposite hand or direction of turn from the helical output member groove 80, depending on whether it is desired to produce additive or differential rotation.

The actuator 10 is provided with a first force-transmitting disk roller 84 and a second force-transmitting disk roller 86. The first disk roller 84 is positioned within an angled slot 88 formed in the carrier first end portion 54 of the roller carrier 50. The first disk roller is rotatably retained in the slot 88 in an axially skewed position relative to the body 12 and the output member 20 by a skew angle corresponding to the lead angle of the helical output member groove 80. The first disk roller 84 is rotatably mounted on a spindle 90 which has its opposite ends retained in bore holes 92 formed in the carrier first end portion 54 on opposite sides of the slot 88 to permit free rotation of the disk roller relative to the roller carrier 50. The first disk roller 84 projects sufficiently far out of the slot 88 to be in seated rolling engagement and coact with the helical output member groove 80 for transmitting force between the roller carrier 50 and the output member 20 as the disk roller rollingly travels in the groove. The spindle 90 retains the first disk roller 84 in a fixed axial and circumferential position relative to the roller carrier 50 as the roller carrier reciprocates within the body 12 during fluid-powered operation of the actuator 10 and allows rotation of the disk roller about the longitudinal axis of the spindle. This spindle axis is at an angle to set the first disk roller 84 at the skew angle mentioned above, which corresponds to the lead angle of the helical output member groove 80. The slot 88 is provided with a width substantially equal to the thickness of the first disk roller 84 to prevent axial movement of the disk roller relative to the spindle 90.

In a similar manner, the second disk roller 86 is positioned within an angled slot 94 formed in the carrier second end portion 56. The second disk roller 86 is rotatably retained in the slot 94 in an axially skewed position relative to the body 12 and the output member 20 by a skew angle corresponding to the lead angle of the helical body groove 74. The second disk roller 86 is rotatably mounted on a spindle 96 which has its opposite ends retained in bore holes 98 formed in the carrier second end portion 56 on opposite sides of the slot 94 to permit free rotation of the disk roller relative to the roller carrier 50. The second disk roller 86 projects sufficiently far out of the slot 94 to be in seated rolling engagement and coact with the helical body groove 74 for transmitting force between the roller carrier 50 and the body 12 as the disk roller rollingly travels in the groove. The spindle 96 retains the second disk roller 86 in a fixed axial and circumferential position relative to the roller carrier 50 as the roller carrier reciprocates within the body 12 during fluid-powered operation of the actuator 10 and allows rotation of the disk roller about the longitudinal axis of the spindle. This spindle axis is at an angle to set the second disk roller 86 at the skew angle mentioned above, which corresponds to the lead angle of the helical body groove 74. The slot 94 is provided with a width substantially equal to the thickness of the second disk roller 86 to prevent axial movement of the disk roller relative to the spindle 96.

Since the first and second disk rollers 84 and 86 are retained by the roller carrier 50 in an axially skewed position relative to the longitudinal axis of the coaxially aligned body 12 and output member 20, the first disk roller 84 is held at a skew angle matching the lead angle of the helical output member groove 80, and the second disk roller 86 is held at a skew angle matching the lead angle of the helical body groove 74, as noted above. As such, the contact faces of each roller are angularly aligned with the contact faces of the helical grooves with which the disk rollers are engaged to transmit torque. This avoids the problem produced when disk rollers are not in full alignment with the grooves they engage.

To help understand the problem involved, it should be remembered that each disk roller rolls in one of the helical grooves and coacts therewith to transmit torque. The greater the angular difference between the plane of the disk roller and the direction of extension of the helical groove portion within which the disk roller is rolling, the more the disk roller tends to roll or bite into the sidewall of the groove as it rolls along, and tends to ride up the sidewall and climb out of the groove, rather than rolling smoothly along the center of the groove. This contact with the groove sidewall produces increased frictional drag and roller scuffing. Moreover, as the disk roller tends to ride up the sidewall, it pulls away from good engagement with the groove. The result is an undesirable drag force being applied to the disk rollers and forces which tend to cause the disk rollers to move out of seated engagement with the grooves in a manner tending to bind the actuator. The disk rollers also tend to scuff along in the grooves since they are not aligned with the grooves for smooth rolling action.

By angularly skewing the first and second disk rollers 84 and 86 so they angularly correspond to the lead angle of the respective helical grooves 74 and 80 they engage, the problem and the undesirable results described above are almost completely avoided. The disk rollers roll smoothly along the center of the grooves with little scuffing. In addition, by the ability to select the lead angle and hand for the helical body and output member grooves 74 and 80 independent of each other, the direction and amount of rotation of the output member 20 and the output torque on the output member can be selected from a wide range of possibilities during the design of the actuator 10. It is noted that while the greatest advantages of skewing are achieved when the disk rollers are skewed to be angularly oriented in full alignment with the left-hand or right-hand grooves they engage, any amount of skewing with an angular orientation corresponding to the hand turn of the engaged groove (i.e., left or right) will improve performance over disk rollers which are held in coaxial alignment with the actuator.

Another benefit is produced in that by locating the first and second disk rollers 84 and 86 at opposite axial ends of the roller carrier 50 and by axially spacing apart the helical body and output member grooves 74 and 80 so that they do not significantly overlap, the overall diameter of the actuator body can be decreased compared to the size of actuators which utilize a single set of rollers engaging both the body and output member grooves, or adjacent rollers where one engages the body groove and one engages the output member groove, with one being positioned radially outward of the other. This requires that an increased radial distance be provided between the output member and the body, particularly when it is desired to have both rollers out of engagement with each other.

As will now be described, linear reciprocation of the roller carrier 50 produces rotation of the roller carrier 50 and the output member 20 through the force-transmitting capability of the first and second disk rollers 84 and 86. As the roller carrier 50 linearly reciprocates between one or the other axial directions within the body 12 through application of fluid pressure to the fluid-tight compartments 62 and 64, torque is transmitted by the second disk roller 86 to the roller carrier through its coaction with the helical body groove 74. The axial force created by fluid pressure on the head portion 58 causes the second disk roller to roll along the helical body groove 74 and transmit torque to the roller carrier 50. The transmitted torque causes the roller carrier 50 to rotate as it moves axially. By way of example, since the helical body groove 74 is left-hand in the embodiment of FIG. 1, the roller carrier 50 rotates counterclockwise when viewed from the first body end 16 as the roller carrier moves from the first body end to the second body end 18 when fluid pressure is applied to the compartment 62 through the port 66. As the roller carrier 50 rotates counterclockwise, the second disk roller 86 rolls along the helical body grooves 74 and rotates clockwise on the spindle 96, as viewed from the first body end 16.

The resulting linear and rotational movement of the roller carrier 50 transmits both axial and rotational force to the output member 20 through the coaction of the first disk roller 84 with the helical output member groove 80. The transmitted force causes the output member 20 to rotate relative to the body 12 since axial movement of the output member is restricted by the thrust bearings 32. As such, axial movement of the roller carrier 50 produced by fluid pressure is converted into relative rotational movement between the body 12 and the output member 20.

Figure 2:
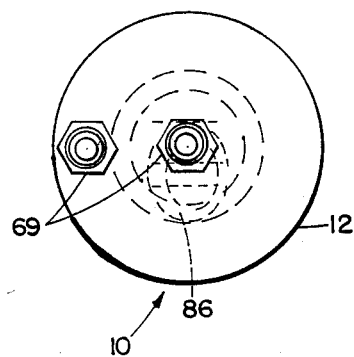
FIG. 2 is a top plan view of the actuator taken substantially along the line 2—2 of FIG. 1.

Continuing the example discussed above, since the helical output member groove 80 is right-hand in the embodiment of FIG. 1, the axial movement of the roller carrier 50 toward the second body end 18 causes the output member 20 to rotate counterclockwise relative to the roller carrier, as viewed from the first body end 16. As the output member 20 rotates counterclockwise, the first disk roller 84 rolls along helical output member groove 80 with a clockwise rotation on the spindle 90. As noted above, since both the roller carrier 50 and the output member 20 rotate counterclockwise in response to the application of fluid pressure to the compartment 62, the resulting relative rotation between the body 12 and the output member is the sum of the rotation of the roller carrier relative to the body and the rotation of the output member relative to the roller carrier.

It is noted that the rotational directions described above are merely reversed when the roller carrier 50 moves from the second body end 18 to the first body end 16 when fluid pressure is applied to the compartment 64 through the port 68.

If desired, the helical body groove 74 and the helical output member groove 80 can be formed with the same hand turn since the first and second disk rollers 84 and 86 are separate and independent, and each coacts only with its own corresponding groove. In that situation, the resulting relative rotation between the body 12 and the output member 20 would be the difference of the rotation of the roller carrier 50 relative to the body and the rotation of the output member relative to the roller carrier. The differential rotation allows for the design of a rotary actuator with less rotary output, but with a longer stroke and thus an increased output torque. This is particularly advantageous when air is used as the fluid to power the actuator since air requires large piston displacements, such as is possible using the long piston stroke produced with differential rotation.

Since separate and independent first and second disk rollers 84 and 86 are used, the helical body and output member grooves 74 and 80 can also be selected with any desired axial pitch independent of the axial pitch of the other, and can be selected with any hand turn, independent of the hand turn of the other. The helical body and output member grooves 74 and 80 may have the same hand or direction of turn to produce differential rotational movement between the body 12 and the output member 20, based upon the differential rotation between the roller carrier 50 and the output member produced by axial movement of the roller carrier, or may have the opposite hand to produce compound rotational movement between the body and the output member to provide a greater output rotation. In addition, the lead angle (i.e., helix angle) selected for the helical body and output member grooves 74 and 80 can be selected as desired, independent of the lead angle of the other. By using separate and independent disk rollers, there is no interrelationship between the lead angles, thus allowing great flexibility in the design of the actuator and the range of output characteristics possible.

A significant advantage of the present invention is the reduction in machining time and cost which results by utilizing helical grooves 74 and 80 only on the body 12 and the output member 20 rather than the four helical grooved surfaces required for force transmission using conventional helical splines or ball races. Cutting of grooves on the roller carrier 50 has been completely eliminated. As such, the number of helical grooves which must be cut with the expensive and slow precision equipment required to cut helical grooves is reduced, thus reducing the expense and time of manufacture. Moreover, the first and second disk rollers 84 and 86 can be simply turned on a lathe.

In addition to transmitting force, the use of the first and second disk rollers 84 and 86 permits increased axial loading of the output member 20 when compared with similarly constructed and sized splined actuators, and even ball actuators using balls for force transmission. The increased load-carrying ability results, at least in part, from the increased surface contact the rollers provide between themselves and the grooved surfaces of the body and output member they engage to distribute load. The increased surface contact also results in an actuator of shorter length when compared to a ball actuator of the same load rating since to achieve the same surface contact as provided by a roller, a string of balls must be used with a length much longer than the axial length of the roller. There is also a savings in length when compared with certain ball actuator designs since the rollers travel axially with the roller carrier 50 and do not require the use of extended-length grooves to avoid ball scuffing for adequate performance. The disk rollers 84 and 86 of the present invention achieve the benefit of reduced friction by using rolling friction, as do balls, rather than the sliding friction of splines, yet the friction reduction over splines can be achieved with rollers using less axial length than balls. As a result of these benefits, the overall actuator weight can be reduced compared to a ball actuator of equivalent power rating and a more reliable actuator produced.

Compared to splines, the disk rollers 84 and 86 also provide the benefit of serving as roller bearings to reduce frictional drag and to provide aligning support for the body, roller carrier and output member. This facilitates easy output member rotation and reduces output member binding under loading.

With the design of the present invention, the actuator 10 can be constructed in extremely small sizes. It is possible to easily and inexpensively construct the actuator having an outer diameter for the body 12 as low as 0.70 to 0.80 inches, which is particularly useful for medical purposes where the actuator is positioned within the human body. For medical uses it may be desirable to use an outer shape for the body 12 other than cylindrical, and this is achievable since the body shown in FIG. 1 toward the second body end 18 has a sidewall 14 much thicker than necessary.

One design for the actuator 10 utilizes a pitch diameter of 0.430 inch, a body outside diameter of 0.875 inches, a helix angle of 30 degrees, and a lead of 0.750 inch. The resulting stroke of the roller carrier 50 is 0.375 inch, with 360 degrees of rotation capability for the output member 20. If a maximum fluid pressure of 1000 p.s.i. is utilized, the torque produced is 8.2 inch-pounds.

It is to be understood that while the described embodiment of FIG. 1, as well as the second embodiment of the invention, which will be described hereinafter, is described as a fluid-powered rotary actuator, devices of the same general construction utilizing the invention may be manufactured for use as linear actuators, fluid pumps, shock absorbers and the like. In the situation of a linear actuator, the output member 20 is partially or completely restrained against rotation but permitted to move axially relative to the body 12 in response to reciprocation of the roller carrier 50. In the situations of pumps or shock absorbers, the output member 20 is rotatably driven by an external device and the resulting reciprocal movement of the roller carrier 50 causes the head portion 58 to pump fluid through the ports 66 and 68.

For ease of understanding, the components of the second embodiment of the invention described hereinafter will be similarly numbered with those of the first embodiment when of a similar construction. Only the differences in construction will be described in detail.

Figure 3:
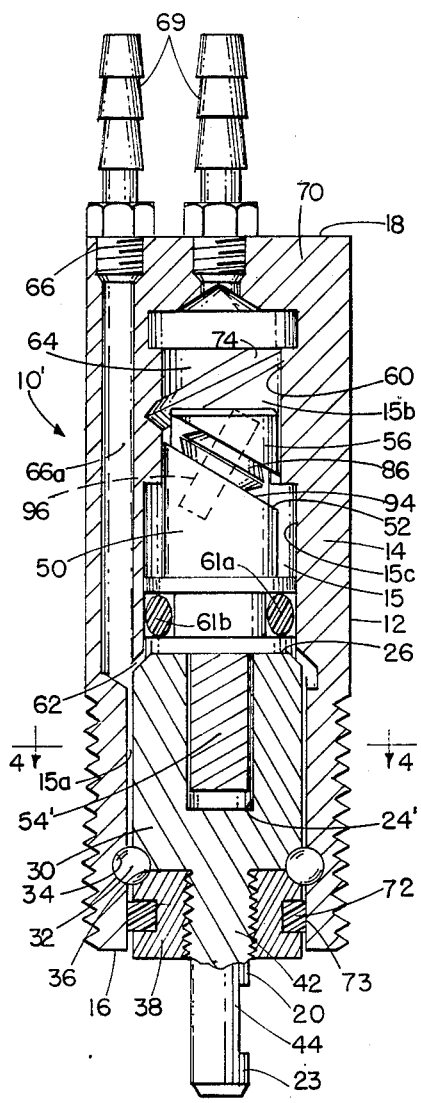
FIG. 3 is a side elevational, sectional view of an alternative embodiment of the invention.
Figure 4:
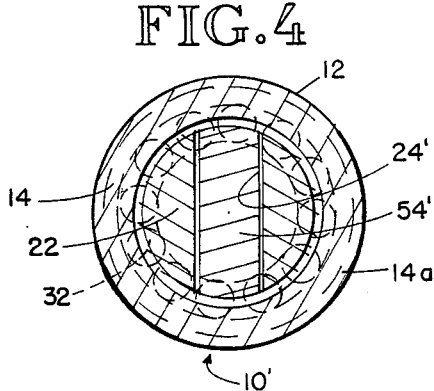
FIG. 4 is a sectional view taken substantially along the line of 4—4 of FIG. 3.

A second embodiment of the invention, very similar in many ways to the embodiment of FIG. 1, is the actuator 10' shown in FIGS. 3 and 4. In this embodiment, however, the first end portion 54' of the roller carrier 50 carries no disk roller, as it did in the embodiment of FIG. 1. Instead, the first end portion 54' is a male key member that extends into and rotationally couples together the correspondingly shaped keyway interior chamber 24' of the output member 20 to transmit the rotation of the roller carrier 50 to the output member 20 and cause its rotation. The first end key portion 54' is slidably disposed in the keyway chamber 24' to allow unrestricted axial sliding movement therebetween as the roller carrier 50 axially reciprocates within the body 12 during fluid-powered operation of the actuator 10'. However, all resulting rotational movement of the roller carrier 50 is transmitted to the output member 20 by the first end key portion 54' to provide a rotary output to the output drive shaft 23. In this embodiment, the amount of rotation produced is solely dependent on the single disk roller 86 and the helical body groove 74.

It will be appreciated that, although specific embodiments of the invention have been described herein for purposes of illustration, various modifications may be made without departing from the spirit and scope of the invention. Accordingly, the invention is not [to be ] limited except as by the appended claims.

I claim:

1. A fluid-power device comprising:
    a body having a first end portion and a second end portion with a midportion therebetween, said body second end portion having at least one helical groove formed on an interior generally cylindrical surface portion thereof, said body groove having an axial pitch and a lead angle with a left- or right-hand turn;
    an axially extending drive member supported for movement relative to said body, said drive member having a sleeve portion defined by a generally cylindrical sleeve wall positioned within said body first end portion, said sleeve wall having an open end positioned toward said body midportion and having at least one helical groove formed on an interior generally cylindrical surface portion thereof, said sleeve groove having an axial pitch and a lead angle with a left- or right-hand turn, said drive member further including an output drive element connected to said drive member sleeve portion for movement therewith, said output drive element projecting outward of said body first end portion and being connectable to an external device;

an elongated, axially reciprocating carrier reciprocally mounted within said body and projecting within said drive member sleeve portion through said sleeve wall open end, said reciprocating carrier rotatably retaining first and second rollers in fixed axial and circumferential position relative to said reciprocating carrier during powered operation of the fluid-power device, said first and second rollers each having at least one circumferential ridge, said first roller being retained by a first end portion of said reciprocating carrier within said drive member sleeve portion in seated rolling engagement with said sleeve groove for transmitting force between said reciprocating carrier and said drive member, and said second roller being retained by a second end portion of said reciprocating carrier within said body second end portion in seated rolling engagement with said body groove for transmitting force between said reciprocating carrier and said body, each ridge of said rollers being positioned for rolling travel in the corresponding grooves of said body and drive member, said rollers being retained by said reciprocating carrier in an axially skewed position relative to said body and drive member with which engaged by a skew angle with an angular orientation corresponding to said hand turn of the corresponding one of said body or drive member groove with which engaged to improve alignment of said roller ridges with said engaged helical grooves; and at least one piston mounted for reciprocal movement and operatively engaging said reciprocating carrier.

2. The device of claim 1 wherein said first end portion of said reciprocating carrier has an exterior circumferential sidewall surface in sliding engagement with said interior surface portion of said sleeve wall and said second end portion of said reciprocating carrier has an exterior circumferential sidewall surface in sliding engagement with said interior surface portion of said body second end portion to restrain lateral movement of said first and second end portions of said reciprocating carrier as said reciprocating carrier reciprocates within said body during powered operation of the device.

3. A fluid-power device comprising:

a body having a first end portion and a second end portion with a midportion therebetween, said body second end portion having at least one helical groove formed on an interior generally cylindrical surface portion thereof, said body groove having an axial pitch and a lead angle with a left- or right-hand turn;

an axially extending drive member supported for movement relative to said body, said drive member having a sleeve portion defined by a generally cylindrical sleeve wall positioned within said body first end portion, said sleeve wall having an open end positioned toward said body midportion and having at least one helical groove formed on an interior generally cylindrical surface portion thereof, said sleeve groove having an axial pitch and a lead angle with a left- or right-hand turn, said drive member further including an output drive element fixedly connected to said drive member sleeve portion for movement therewith, said output drive element projecting outward of said body first end portion and being connectable to an external device;

an elongated, axially reciprocating carrier reciprocally mounted within said body and projecting within said drive member sleeve portion through said sleeve wall open end, said reciprocating carrier rotatably retaining first and second rollers in fixed axial and circumferential position relative to said reciprocating carrier during powered operation of the fluid-power device, said first and second rollers each having at least one circumferential ridge, said first roller being retained by a first end portion of said reciprocating carrier within said drive member sleeve portion in seated rolling engagement with said sleeve groove for transmitting force between said reciprocating carrier and said drive member, and said second roller being retained by a second end portion of said reciprocating carrier within said body second end portion in seated rolling engagement with said body groove for transmitting force between said reciprocating carrier and said body, each ridge of said rollers being positioned for rolling travel in the corresponding grooves of said body and drive member, said rollers being retained by said reciprocating carrier in an axially skewed position relative to said body and drive member with which engaged by a skew angle with an angular orientation corresponding to said hand turn of the corresponding one of said body or drive member groove with which engaged to improve alignment of said roller ridges with said engaged helical grooves, said first end portion of said reciprocating carrier having a first recess formed therein with a first radially outward opening and said second end portion of said reciprocating carrier having a second recess formed therein with a second radially outward opening, said first and second rollers being positioned in said first and second recesses, respectively, said first roller projecting outward through said first opening beyond said first end portion of said reciprocating carrier to rollingly engage said sleeve groove and said second roller projecting outward through said second opening beyond said second end portion of said reciprocating carrier to rollingly engage said body groove; and at least one piston mounted for reciprocal movement and operatively engaging said reciprocating carrier.

4. The device of claim 1 wherein said first and second end portions of said reciprocating carrier are fixedly attached to said piston, one to each axial side of said piston, said piston being reciprocally mounted within said body midportion.

5. The device of claim 4, further including a seal sealing between said piston and said body midportion to define a fluid-tight compartment to each axial side of said piston.

6. The device of claim 3 wherein said first and second rollers each consist of a single roller disk, and said first and second recesses are each slots sized to receive therein said first and second roller disks, respectively.

7. The device of claim 6 wherein said first slot and said first roller disk therein are in an axially skewed position relative to said sleeve wall of said drive member at a skew angle corresponding to the hand turn of said sleeve groove, and said second slot and said second roller disk therein are in an axially skewed position relative to said body at a skew angle corresponding to the hand turn of said body groove.

8. A fluid-power device comprising:

a body having a first end portion and a second end portion with a midportion therebetween, said body second end portion having at least one helical groove formed on an interior generally cylindrical surface portion thereof, said body groove having an axial pitch and lead angle with a left- or right-hand turn;

an axially extending drive member supported for rotary movement relative to said body, said drive member having a coupling portion positioned within said body first end portion with a coupling recess therein, said drive member coupling recess having an open end positioned toward said body midportion, said drive member further including an output drive element connected to said coupling portion for rotational movement therewith, said output drive element projecting outward of said body first end portion and being connectable to an external device;

an elongated, axially reciprocating carrier reciprocally mounted within said body, said reciprocating carrier having a coupling member projecting within said drive member coupling recess through said recess open end, said coupling member and said coupling portion being connected together to permit substantially uninhibited axial movement of said coupling member in said coupling recess as said reciprocating carrier axially reciprocates within said body and to couple said reciprocating carrier to said drive member to transmit rotational forces therebetween during powered operation, said reciprocating carrier rotatably retaining a roller in fixed axial and circumferential position relative to said reciprocating carrier during powered operation of the fluid-power device, said roller having at least one circumferential ridge, said roller being retained by a second end portion of said reciprocating carrier within said body second end portion in seated rolling engagement with said body groove for transmitting force between said reciprocating carrier and said body, said ridge of said roller being positioned for rolling travel in the body groove, said roller being retained by said reciprocating carrier in an axially skewed position relative to said body by a skew angle with an angular orientation corresponding to said hand turn of said body groove with which engaged to improve alignment of said roller ridges with said engaged helical groove; and a piston mounted for reciprocal movement and operatively engaging said reciprocating carrier.

9. The device of claim 8 wherein said roller is retained by an end portion of said reciprocating carrier having an exterior circumferential sidewall surface in sliding engagement with said interior surface portion of said body second end portion to restrain lateral movement of said carrier end portion as said reciprocating carrier reciprocates within said body during powered operation of the fluid-power device.

10. A fluid-power device comprising:

a body having a first end portion and a second end portion with a midportion therebetween, said body second end portion having at least one helical groove formed on an interior generally cylindrical surface portion thereof, said body groove having an axial pitch and lead angle with a left- or right-hand turn;

an axially extending drive member supported for rotary movement relative to said body, said drive member having a coupling portion positioned within said body first end portion with a coupling recess therein, said drive member coupling recess having an open end positioned toward said body midportion, said drive member further including an output drive element connected to said coupling portion for rotational movement therewith, said output drive element projecting outward of said body first end portion and being connectable to an external device;

an elongated, axially reciprocating carrier reciprocally mounted within said body, said reciprocating carrier having a coupling member projecting within said drive member coupling recess through said recess open end, said coupling member and said coupling portion being connected together to permit substantially uninhibited axial movement of said coupling member in said coupling recess as said reciprocating carrier axially reciprocates within said body and to couple said reciprocating carrier to said drive member to transmit rotational forces therebetween during powered operation, said reciprocating carrier rotatably retaining a roller in fixed axial and circumferential position relative to said reciprocating carrier during powered operation of the fluid-power device, said roller having at least one circumferential ridge, said roller being retained by a second end portion of said reciprocating carrier within said body second end portion in seated rolling engagement with said body groove for transmitting force between said reciprocating carrier and said body, said ridge of said roller being positioned for rolling travel in the body groove, said roller being retained by said reciprocating carrier in an axially skewed position relative to said body by a skew angle with an angular orientation corresponding to said hand turn of said body groove with which engaged to improve alignment of said roller ridges with said engaged helical groove, an end portion of said reciprocating carrier retaining said roller in a first recess formed therein with a radially outward opening, said roller projecting outward through said recess opening beyond said carrier end portion to rollingly engage said body groove; and a piston mounted for reciprocal movement and operatively engaging said reciprocating carrier.

11. The device of claim 10 wherein said carrier end portion and said coupling member are fixedly attached to said piston, one to each axial side of said piston, said piston being reciprocally mounted within said body midportion.

12. The device of claim 11, further including a seal sealing between said piston and said body midportion to define a fluid-tight compartment to each axial side of said piston.

13. The device of claim 10 wherein said roller consists of a single roller disk, and said carrier recess is a slot sized to receive therein said roller disk.

14. The device of claim 13 wherein said slot and said roller disk therein are in an axially skewed position relative to said body at a skew angle corresponding to the hand turn of said body groove.

15. A fluid-power device comprising:

a body;

an axially extending drive member supported for movement relative to said body and connectable to an external device, one of said body or said drive member having at least one helical groove formed on a surface portion thereof positioned within said body;

at least one roller having at least one circumferential ridge;

an axially reciprocating carrier reciprocally mounted within said body, said reciprocating carrier rotatably retaining said roller in fixed axial and circumferential position relative to said reciprocating carrier during powered operation of the fluid-power device, with said roller in seated rolling engagement with said grooved surface portion for transmitting force between said reciprocating carrier and the one of said body or said drive member having said grooved surface portion, said ridge of said roller being positioned for rolling travel in said helical groove of said grooved surface portion;

means for transmitting torque between said reciprocating carrier and the other of said body or said drive member; and at least one piston mounted for reciprocal movement and operatively engaging said reciprocating carrier.

16. The device of claim 15 wherein said helical groove of said grooved surface portion of said body or said drive member has an axial pitch and a lead angle with a left- or right-hand turn, and wherein said roller is retained by said reciprocating member in an axially skewed position relative to said body or drive member with which engaged by a skew angle with an angular orientation corresponding to said hand turn to improve alignment of said roller ridge with said engaged helical groove of said grooved surface portion.

17. The device of claim 16 wherein said roller has a skew angle generally corresponding to said lead angle of said helical groove.

18. A fluid-power device comprising:
a body;
an axially extending drive member supported for movement relative to said body and connectable to an external device, one of said body or said drive member having at least one helical groove formed on a surface portion thereof positioned within said body;

at least one roller having at least one circumferential ridge;

an axially reciprocating carrier reciprocally mounted within said body, said reciprocating carrier rotatably retaining said roller in fixed axial and circumferential position relative to said reciprocating carrier during powered operation of the fluid-power device, with said roller in seated rolling engagement with said grooved surface portion for transmitting force between said reciprocating carrier and the one of said body or said drive member having said grooved surface portion, said ridge of said roller being positioned for rolling travel in said helical groove of said grooved surface portion, said reciprocating carrier including a recess with a radially outward opening, with said roller positioned in said recess and projecting outward through said opening beyond said reciprocating carrier to rollingly engage said grooved surface portion;

means for transmitting torque between said reciprocating carrier and the other of said body or said drive member; and at least one piston mounted for reciprocal movement and operatively engaging said reciprocating carrier.

19. The device of claim 18 wherein said recess has a pair of opposed and spaced-apart wall portions, with each of said wall portions supporting one or the other end of a spindle which rotatably retains said roller against axial and circumferential movement relative to said reciprocating carrier.

20. The device of claim 19 wherein said spindle extends coaxial with said roller.

21. The device of claim 20, further including a coaxial pair of bore holes, each sized to receive one of said ends of said spindle, with said pair of bore holes having one bore hole in one of said wall portions and the other bore hole in the other of said wall portions.

22. The device of claim 21 wherein said helical groove of said grooved surface portion of said body or said drive member has a lead angle with a left-hand or right-hand turn, wherein said roller is retained by said spindle in an axially skewed position relative to said body or drive member with which engaged by a skew angle with an angular orientation corresponding to said hand turn to improve alignment of said roller ridge with said engaged helical grooves of said grooved surface portion, and wherein said bore holes are at a bore hole skew angle corresponding to said roller skew angle, with said spindle ends being disposed in corresponding ones of said pair of bore holes.

23. The device of claim 18 wherein said helical groove of said grooved surface portion of said body or said drive member has a lead angle with a left-or right-hand turn, and wherein said roller is retained by said reciprocating carrier in an axially skewed position relative to said body or drive member with which engaged by a skew angle with an angular orientation corresponding to said hand turn to improve alignment of said roller ridge with said engaged helical groove of said grooved surface portion.

24. The device of claim 23 wherein said reciprocating carrier retains said roller in said axially skewed position by a skew angle substantially equal to said groove lead angle.

25. A fluid-power device comprising:
a body having a first end portion and a second end portion with a midportion therebetween, said body second end portion having at least one helical groove formed on an interior generally cylindrical surface portion thereof, said body groove having an axial pitch and a lead angle with a left- or right-hand turn;

an axially extending drive member supported for movement relative to said body, said drive member having a portion positioned within said body first end portion, with at least one helical groove formed on a surface portion thereof, said drive member groove having an axial pitch and a lead angle with a left- or right-hand turn, said drive member further including an output drive element projecting outward of said body first end portion and being connectable to an external device;

an elongated, axially reciprocating carrier reciprocally mounted within said body, said reciprocating carrier rotatably retaining first and second rollers in fixed axial and circumferential position relative to said reciprocating carrier during powered operation of the fluid power device, said first and second rollers each having at least one circumferential ridge, said first roller being retained by a first end portion of said reciprocating carrier in seated rolling engagement with said drive member groove for transmitting force between said reciprocating carrier and said drive member, and said second roller being retained by a second end portion of said reciprocating carrier within said body second end portion in seated rolling engagement with said body groove for transmitting force between said reciprocating carrier and said body, each ridge of said rollers being positioned for rolling travel in the corresponding grooves of said body and drive member; and at least one piston mounted for reciprocal movement and operatively engaging said reciprocating carrier.

26. The device of claim 25 wherein said first end portion of said reciprocating carrier has an exterior circumferential sidewall surface in sliding engagement with said drive member surface portion and said second end portion of said reciprocating carrier has an exterior circumferential sidewall surface in sliding engagement with said interior surface portion of said body second end portion to restrain lateral movement of said first and second end portions of said reciprocating carrier as said reciprocating carrier reciprocates within said body during powered operation of the fluid-power device.

27. A fluid-power device comprising:

a body having a first end portion and a second end portion with a midportion therebetween, said body second end portion having at least one helical groove formed on an interior generally cylindrical surface portion thereof, said body groove having an axial pitch and a lead angle with a left- or right-hand turn;

an axially extending drive member supported for movement relative to said body, said drive member having a portion positioned within said body first end portion, with at least one helical groove formed on a surface portion thereof, said drive member groove having an axial pitch and a lead angle with a left- or right-hand turn, said drive member further including an output drive element projecting outward of said body first end portion and being connectable to an external device;

an elongated, axially reciprocating carrier reciprocally mounted within said body, said reciprocating carrier rotatably retaining first and second rollers in fixed axial and circumferential position relative to said reciprocating carrier during powered operation of the fluid-power device, said first and second rollers each having at least one circumferential ridge, said first roller being retained by a first end portion of said reciprocating carrier in seated rolling engagement with said drive member groove for transmitting force between said reciprocating carrier and said drive member, and said second roller being retained by a second end portion of said reciprocating carrier within said body second end portion in seated engagement with said body groove for transmitting force between said reciprocating carrier and said body, each ridge of said rollers being positioned for rolling travel in the corresponding grooves of said body and drive member, said first end portion of said reciprocating carrier having a first recess formed therein with a first radially outward opening and said second end portion of said reciprocating carrier having a second recess formed therein with a second radially outward opening, said first and second rollers being positioned in said first and second recesses, respectively, said first roller projecting outward through said first opening beyond said first end portion of said reciprocating carrier to rollingly engage said drive member groove and said second roller projecting outward through said second opening beyond said second end portion of said reciprocating carrier to rollingly engage said body groove; and at least one piston mounted for reciprocal movement and operatively engaging said reciprocating carrier.

28. The device of claim 25 wherein said first and second end portions of said reciprocating carrier are fixedly attached to said piston, one to each axial side of said piston, said piston being reciprocally mounted within said body midportion.

29. The device of claim 27 wherein said first and second rollers each consist of a single roller disk, and said first and second recesses are each slots sized to receive therein said first and second roller disks, respectively.

30. The device of claim 29 wherein said first slot and said first roller disk therein are in an axially skewed position relative to said drive member at a skew angle corresponding to the hand turn of said drive member groove, and said second slot and said second roller disk therein are in an axially skewed position relative to said body at a skew angle corresponding to the hand turn of said body groove.

31. A fluid-power device comprising:

a body having a first end portion and a second end portion with a midportion therebetween, said body second end portion having at least one helical groove formed on an interior generally cylindrical surface portion thereof, said body groove having an axial pitch and lead angle with a left- or right-hand turn;

an axially extending drive member supported for rotary movement relative to said body, said drive member having a coupling portion positioned within said body first end portion, said drive member further including an output drive element connected to said coupling portion for rotational movement therewith, said output drive element projecting outward of said body first end portion and being connectable to an external device;

an elongated, axially reciprocating carrier reciprocally mounted within said body, said reciprocating carrier having a coupling member coupled to said coupling portion to permit substantially uninhibited axial movement of said coupling member relative to said coupling portion as said reciprocating carrier axially reciprocates within said body and to couple said reciprocating carrier to said drive member to transmit rotational forces therebetween during powered operation, said reciprocating carrier rotatably retaining a roller in fixed axial and circumferential position relative to said reciprocating carrier during powered operation of the fluid-power device, said roller having at least one circumferential ridge, said roller being retained by a second end portion of said reciprocating carrier within said body second end portion in seated rolling engagement with said body groove for transmitting force between said reciprocating carrier and said body, said ridge of said roller being positioned for rolling travel in the body groove; and a piston mounted for reciprocal movement and operatively engaging said reciprocating carrier.

32. The device of claim 31 wherein said roller is retained by an end portion of said reciprocating carrier having an exterior circumferential sidewall surface in sliding engagement with said interior surface portion of said body second end portion to restrain lateral movement of said carrier end portion as said reciprocating carrier reciprocates within said body during powered operation of the fluid-power device.

33. A fluid-power device comprising:

a body having a first end portion and a second end portion with a midportion therebetween, said body second end portion having at least one helical groove formed on an interior generally cylindrical surface portion thereof, said body groove having an axial pitch and lead angle with a left- or right-hand turn;

an axially extending drive member supported for rotary movement relative to said body, said drive member having a coupling portion positioned within said body first end portion, said drive member further including an output drive element connected to said coupling portion for rotational movement therewith, said output drive element projecting outward of said body first end portion and being connectable to an external device;

an elongated, axially reciprocating carrier reciprocally mounted within said body, said reciprocating carrier having a coupling member coupled to said coupling portion to permit substantially uninhibited axial movement of said coupling member relative to said coupling portion as said reciprocating carrier axially reciprocates within said body and to couple said reciprocating carrier to said drive member to transmit rotational forces therebetween during powered operation, said reciprocating carrier rotatably retaining a roller in fixed axial and circumferential position relative to said reciprocating carrier during powered operation of the fluid-power device, said roller having at least one circumferential ridge, said roller being retained by a second end portion of said reciprocating carrier within said body second end portion in seated rolling engagement with said body groove for transmitting force between said reciprocating carrier and said body, said ridge of said roller being positioned for rolling travel in the body groove, an end portion of said reciprocating carrier retaining said roller in a first recess formed therein with a radially outward opening, said roller projecting outward through said recess opening beyond said carrier end portion to rollingly engage said body groove; and a piston mounted for reciprocal movement and operatively engaging said reciprocating carrier.

34. The device of claim 33 wherein said carrier end portion and said coupling member are fixedly attached to said piston, one to each axial side of said piston, said piston being reciprocally mounted within said body midportion.

35. The device of claim 33, wherein said roller consists of a single roller disk, and said carrier recess is a slot sized to receive therein said roller disk.

36. The device of claim 35 wherein said slot and said roller disk therein are in an axially skewed position relative to said body at a skew angle corresponding to the hand turn of said body groove.

* * * * *